(12) United States Patent
Trueheart et al.

(10) Patent No.: US 12,312,157 B2
(45) Date of Patent: May 27, 2025

(54) DIFFUSER SPOUT FOR LOAD OUT SILO

(71) Applicant: SANDBOX ENTERPRISES, LLC, Katy, TX (US)

(72) Inventors: Chad Trueheart, Katy, TX (US); Casey Taylor, Katy, TX (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 223 days.

(21) Appl. No.: 18/110,812

(22) Filed: Feb. 16, 2023

(65) Prior Publication Data
US 2023/0257192 A1    Aug. 17, 2023

Related U.S. Application Data

(60) Provisional application No. 63/268,170, filed on Feb. 17, 2022.

(51) Int. Cl.
*B65G 11/18*    (2006.01)
*B65D 88/28*    (2006.01)
*B65D 88/30*    (2006.01)
*B65G 11/10*    (2006.01)

(52) U.S. Cl.
CPC ............. *B65D 88/28* (2013.01); *B65D 88/30* (2013.01); *B65G 11/18* (2013.01)

(58) Field of Classification Search
CPC ........ B65D 88/28; B65D 88/30; B65G 11/10; B65G 11/18; B65G 11/106; B65G 11/166
USPC ............................................ 193/5, 25 R, 2 A
See application file for complete search history.

(56) References Cited

U.S. PATENT DOCUMENTS

| | | | | |
|---|---|---|---|---|
| 4,382,498 | A * | 5/1983 | Glendinning | B65G 11/186 193/34 |
| 9,340,353 | B2 * | 5/2016 | Oren | B65D 90/587 |
| 9,421,899 | B2 | 8/2016 | Oren | |
| 9,771,224 | B2 | 9/2017 | Oren et al. | |
| 9,809,381 | B2 | 11/2017 | Oren et al. | |
| 9,815,620 | B2 | 11/2017 | Oren et al. | |
| 9,856,085 | B1 * | 1/2018 | Workman | B65G 11/026 |
| 9,902,513 | B2 * | 2/2018 | Kawata | B65B 39/007 |
| 9,925,690 | B2 * | 3/2018 | Morrissette | B65G 11/026 |
| 10,464,741 | B2 | 11/2019 | Oren et al. | |
| 10,807,742 | B2 * | 10/2020 | Nienberg | B65B 1/12 |
| 10,829,322 | B1 * | 11/2020 | Smith | B61D 7/02 |
| 11,104,510 | B2 * | 8/2021 | O'Neill | B66F 9/125 |
| 11,192,731 | B2 * | 12/2021 | Lucas | B65G 65/40 |
| 11,338,260 | B2 * | 5/2022 | Weeter | B01F 35/71731 |

(Continued)

FOREIGN PATENT DOCUMENTS

WO    WO-2017121488 A1 *    7/2017    ........... B65G 11/066

OTHER PUBLICATIONS

US 2023/0183022 A1, Garcia et al., Jun. 15 (Year: 2023).*

*Primary Examiner* — Douglas A Hess
(74) *Attorney, Agent, or Firm* — Osha Bergman Watanabe & Burton LLP

(57) ABSTRACT

An apparatus configured for an outlet of a load out silo provided for dispensing proppant from the silo into a storage container. The apparatus comprises a diffuser spout having a housing configured for securing the diffuser spout to the silo outlet and a diffuser element including a first end disposed in the housing, a second end terminating below the housing and a conical sidewall extending between the first and second ends. Flanges extend from the housing for securing the diffuser element thereto.

5 Claims, 2 Drawing Sheets

(56) References Cited

U.S. PATENT DOCUMENTS

| | | | |
|---|---|---|---|
| 11,511,938 B2 * | 11/2022 | Graham | ............... B65G 11/026 |
| 2021/0013008 A1 | 1/2021 | Hong et al. | |
| 2021/0130113 A1 | 5/2021 | Shepherd | |

\* cited by examiner

DIFFUSER SPOUT FOR LOAD OUT SILO

TECHNICAL FIELD

The present disclosure relates generally to bulk material handling equipment, and more particularly relates to a diffuser spout for a load out silo dispensing proppant into a portable storage container.

BACKGROUND

This section provides background information related to the present disclosure which is not necessarily prior art.

Hydraulic fracturing is the propagation of fractions in a rock layer caused by the presence of pressurized fluid. Hydraulic fractures may form naturally, in the case of veins or dikes, or may be man-made in order to release fossil fuels, for example petroleum, natural gas, coal seam gas, or other substances, for extraction. Fracturing is done from a wellbore drilled into reservoir rock formations. The energy from the injection of a highly pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevents the fractures from closing when the injection is stopped.

Conventionally, a processed silica sand also known as proppant is used in hydraulic fracturing operations to provide the desired proppant characteristics (i.e., shape, grain size, and moisture content). Such processing, which typically includes drying and grading of the sand, is performed at or near the mining site and requires significant resources in the form of equipment and utilities. As a result, there is a significant addition to the cost and timing to store, transport and dispense proppant to a hydraulic fracturing operation at a well site from the mining site.

Applicant has recently been looking for means to further improve the logistics and reduce the cost associated with supplying proppant in the hydraulic fracturing operation. Such efforts have been focused on reducing or eliminating the post-mining processes, in particular certain drying operations, so that sand may be used directly from the mining operation. In this context, the term "wet sand" or "dirty sand" has been used to refer to an unprocessed sand. These efforts have not been without difficulties in the logistics for storing, transporting and dispensing wet sand. The higher moisture content of the sand changes the weight, packing characteristics and fluidity of the proppant. As a result, there is a need to improve the containerized units, and material handling/conveyor systems used for storing, transporting and dispensing wet sand to a hydraulic fracturing operation at a well site.

Likewise, over the past decade, Applicant has developed various systems and methods to advance the logistics for delivering the quantities of proppant from sand mines to the well site, which facilitate the ability to store proppant quickly and inexpensively in containerized units specifically configured for loading, transporting and off-loading on a variety of transportation vehicles. These systems and methods further include various material handling and conveyor systems for filling and/or emptying the containerized units and dispensing the proppant to the well site.

In one aspect, containerized units (or simply containers) are employed for storing and transporting wet sand. In another aspect, the present disclosure provides material handling/conveyor systems for dispensing wet sand. These embodiment represent improvements to the system and components previous developed by Applicant, for example as disclosed in one or more of the following patents or published applications: U.S. Pat. Nos. 9,340,353; 9,421,899; 9,771,224; 9,809,381, 9,815,620; 10,464,741; US 2021/013008 and US 2021/0130113. The disclosure of each of these patents and published applications are expressly incorporated by reference herein.

With the implementation of these systems and components, proppant, whether in the form of a processed silica or wet sand, is typically dispensed from a storage silo into the individual storage container at the load out site. However, conventional load out systems struggle to completely fill the storage containers. Rather, proppant tends to mound in the middle of the container and does not spread out over the entire interior volume and into the corners of the container.

Accordingly, there is a need in the industry to provide means for quickly and efficiently dispensing proppant from the storage silo to completely fill the individual storage containers. The diffuser spout disclosed herein provides such a means. Desirable features and characteristics of the diffuser spout will become apparent from the subsequent detailed description of the invention and the appended claims, taken in conjunction with the accompanying drawings and this background of the invention.

BRIEF DESCRIPTION OF THE DRAWINGS

The drawings described herein are for illustrative purposes only of selected embodiments, not all possible implementations, and are not intended to limit the scope of the present disclosure.

Corresponding reference numerals indicate corresponding parts throughout the several views of the drawings.

DETAILED DESCRIPTION

An apparatus is configured for an outlet of a load out silo provided for dispensing proppant from the silo into a storage container. The apparatus comprises a diffuser spout having a housing configured for securing the diffuser spout to the silo outlet and a diffuser element including a first end disposed in the housing, a second end terminating below the housing and a conical sidewall extending between the first and second ends. Flanges extend from the housing for securing the diffuser element thereto.

Example embodiments will now be described more fully with reference to the accompanying drawings. There is no intention to be limited by any principle presented in the preceding background or the following detailed description.

Figure 1:
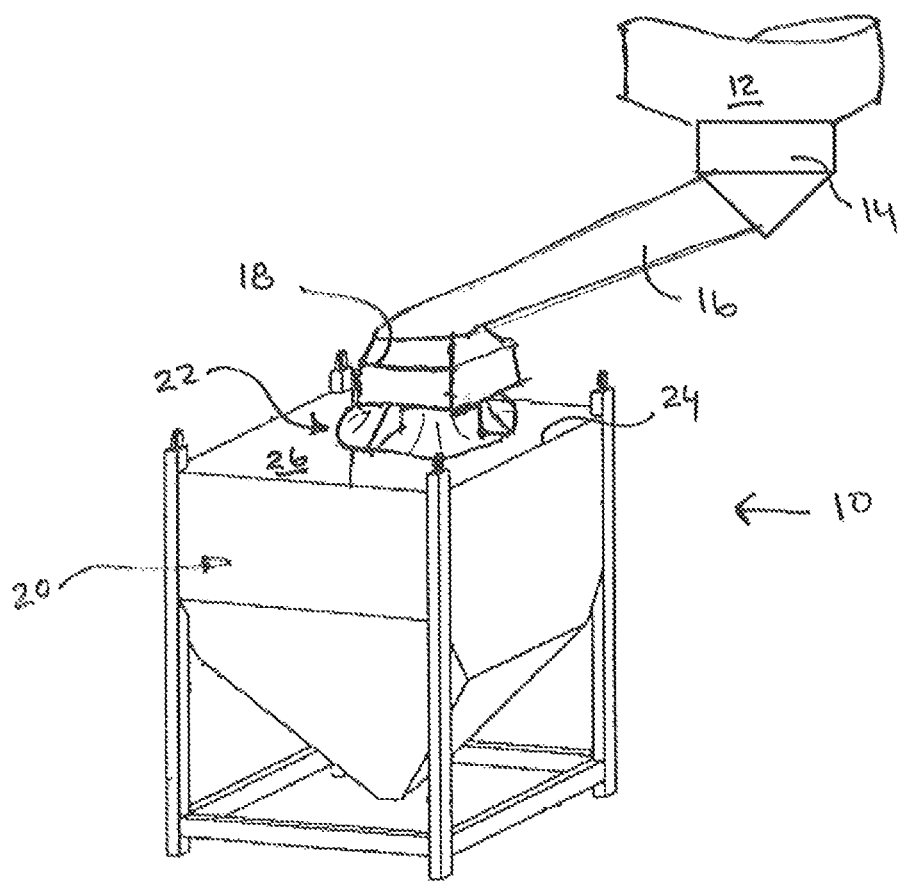
FIG. 1 is an overview illustration of a load out station for filling proppant storage containers.
Figure 2:
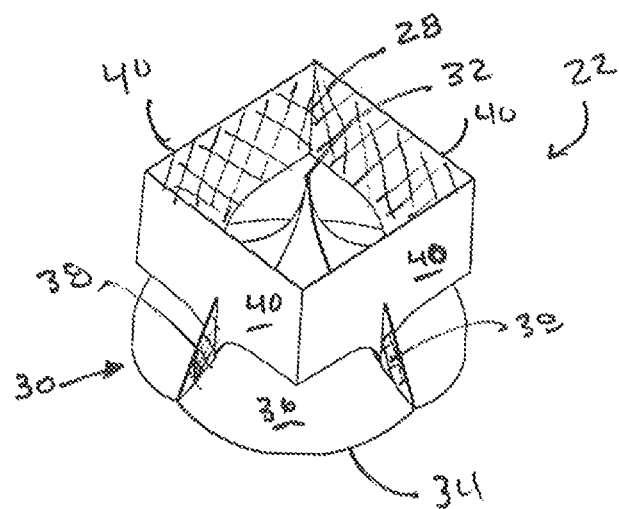
FIG. 2 is a perspective view of a diffuser spout in accordance with the present disclosure.

With reference now to FIGS. 1 and 2, a load out station 10 includes a silo 12 with a discharge mechanism 14 located at the bottom of the silo 12 and a chute 16 extending from the discharge mechanism 14 and terminating at an outlet 18 above a storage container 20. Proppant stored in the silo 12 can be metered through the discharge mechanism 14 and fed via gravity through the chute 16 out the outlet 18 and into the container 20. A diffuser spout 22 is configured at the end of the chute 16 over the outlet 18 and functions to spread proppant exiting the chute 16 across the opening 24 above the interior volume 26 of the container 20.

Figure 3:
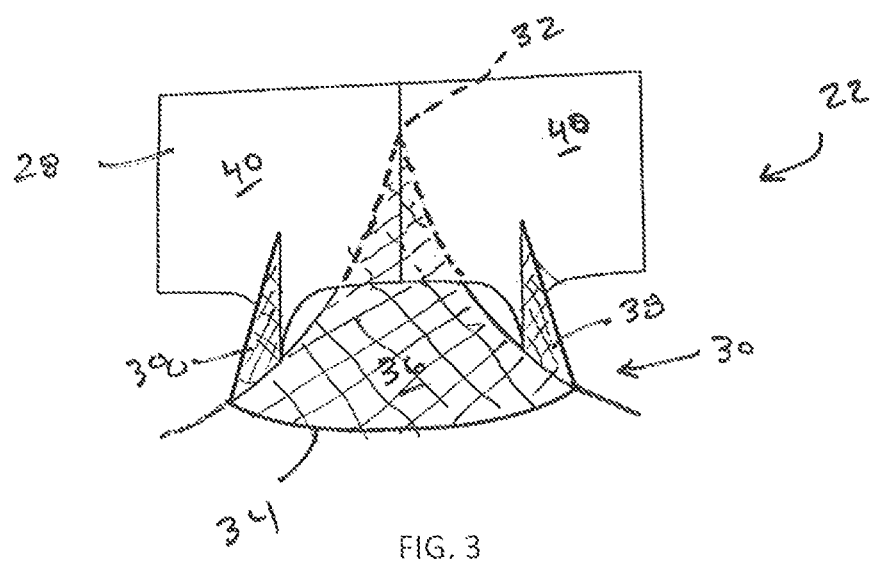
FIG. 3 is a side view of the diffuser spout shown in FIG. 2.
Figure 4:
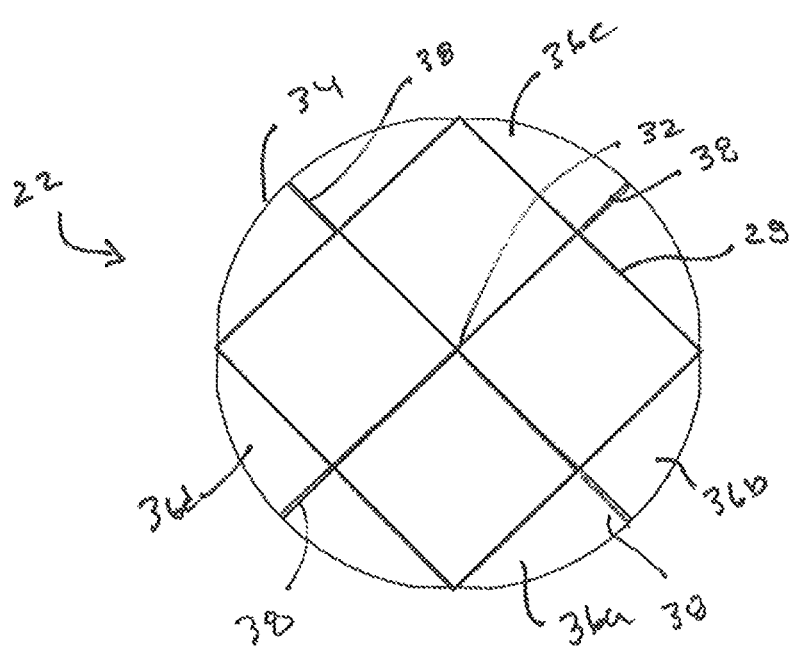
FIG. 4 is a top view of the diffuser spout shown in FIG. 2.

With reference now to FIGS. 2-4, the diffuser spout 22 includes a housing 28 configured for securing the diffuser spout 22 to the chute 16 and a diffuser element 30 including a first end 32 disposed in the housing 28, a second end 34 terminating below the housing 28 and a conical surface 36 extending between the first and second ends 32, 34. Flanges 38 extend from the housing 28 for securing the diffuser element 30 thereto.

The housing 28 has a plurality of wall sections 40 forming a rectangular housing that confirms to the shape of the chute 16 at the outlet 18. One skilled in the art will appreciate that the shape of the housing may vary for conforming to the shape of the chute 16 at outlet 18. At least one flange 38 extends from each of the wall sections 40 to support the diffuser element 30 on the housing 28. The flanges 38 may also function to directed proppant discharged from the diffuser spout 22. As illustrated, the flanges 38 extend from the outer face of the wall sections 40 down and out to the perimeter of the second end 34. While not illustrated as such, the flanges may also extend from the inner face of the wall sections 40 inwardly to the top portion of the conical section 36 at the first end 32. Likewise, the flanges 38 may extend from both the inner face and outer face of the wall sections 40 as described above.

The conical surface 36 expands from the first end 32 to the second end 34 of the diffuser spout 22. As illustrated, the conical surface 36 is formed by four curved sections 36*a*, 36*b*, 36*c*, 36*d* that are fabricated together in the form of a pyramid having concaved walls as best seen in FIG. 3. In one embodiment, the conical surface 36 has an angle of about 60° at the first end 32 and the curvature of concaved walls has a radius in the range of 10-18 inches, and preferably a radius of about 12 inches. The second end 34 of the conical surface 36 defines a circular perimeter which promotes the distribution of proppant into the corner of the storage container 20. In accordance with the present disclosure, the conical surface may take the form of other conical geometries without deviating from the scope and spirit of the present disclosure.

The diffuser spout 22 may be fabricated as a sheet metal component and secured to the chute 16 using conventional metal fasteners. Alternately, the diffuser spout 22 may be releasably secured to the chute 16 using pins, hasps clips, clamps or other suitable mechanical fastening mechanisms.

In certain applications, such as when using wet sand as proppant, it is beneficial to provide a friction-reducing layer or simply slip coating on the interior surfaces of the housing 28 and the exposed surfaces of the conical surface 36 and flanges 38 (noted by cross-hatching in FIGS. 2 and 3) for encouraging proppant to move through these components and for preventing deterioration of the metal structure of these components by resisting water and withstanding moisture in the wet sand. The slip coating may be applied in a variety of way. For example, the slip coating may be a flexible sheet product, for example an ultra-high molecular weight plastic sheeting, that is secured to the various surfaces with mechanical fasteners, adhesives or a combinations of those securing means. In one alternate embodiment, a liquid form of the slip coating material may be applied and cured to these interior surfaces by any suitable manner (e.g. spraying, brushing, dipping, or otherwise depositing). In another alternate embodiment, a ceramic coating in the form of a powder or slurry may be applied and adhered to these interior surfaces by any suitable manner (e.g. spraying, brushing, dipping, or otherwise depositing).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A diffuser spout for a load out silo dispensing proppant into a portable storage container comprising:
   a housing configured for securing the diffuser spout to the silo outlet;
   a diffuser element including a first end disposed in the housing, a second end terminating below the housing and a conical sidewall extending between the first and second ends; and
   at least one flange extending from the housing and securing the diffuser element thereto,
   wherein the conical surface has a slip coating formed thereon, and
   wherein the at least one flange has a slip coating formed thereon.

2. The diffuser spout according to claim 1, wherein the conical surface comprises at least one curved section.

3. The diffuser spout according to claim 1, wherein the conical surface comprises four curved sections fabricated together in the form of a pyramid having concaved walls.

4. The diffuser spout according to claim 1, wherein the housing has an inner surface with a slip coating formed thereon.

5. A diffuser spout for a load out silo dispensing proppant into a portable storage container comprising:
   a housing having four wall sections forming a rectangular configuration for securing the diffuser spout to the silo outlet;
   a diffuser element including a first end disposed in the housing, a second end terminating below the housing and a conical sidewall extending between the first and second ends, wherein the conical sidewall has four curved sections fabricated together in the form of a pyramid having concaved walls; and
   a plurality of flanges extending from the housing and securing the diffuser element thereto, wherein each wall section has at least one flange extending to and securing the diffuser element to the housing,
   wherein the conical surface of the diffuser element and an inner surface of the housing has a slip coating formed thereon.

\* \* \* \* \*